US011829480B2

(12) United States Patent
Hsieh et al.

(10) Patent No.: US 11,829,480 B2
(45) Date of Patent: Nov. 28, 2023

(54) REMOTE ACCESS OF SYSTEM REGISTER CONFIGURATION (71) Applicant: Quanta Computer Inc., Taoyuan (TW)

(72) Inventors: Pei-Chun Hsieh, Taoyuan (TW); Chin-Huai Hsu, Taoyuan (TW); Chun-Ping Huang, Taoyuan (TW); Yen-Ju Ku, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/724,752

(22) Filed: Apr. 20, 2022

(65) Prior Publication Data
US 2023/0342470 A1 Oct. 26, 2023

(51) Int. Cl.
G06F 21/57 (2013.01)
G06F 9/4401 (2018.01)
H04L 41/0803 (2022.01)
G06F 9/445 (2018.01)
G06F 15/177 (2006.01)

(52) U.S. Cl.
CPC .......... G06F 21/572 (2013.01); G06F 9/4401 (2013.01); H04L 41/0803 (2013.01); G06F 9/44505 (2013.01); G06F 15/177 (2013.01)

(58) Field of Classification Search
CPC .. G06F 9/4401; G06F 9/44505; G06F 21/572; G06F 15/177; H04L 41/0803
USPC ................................................ 713/1, 2, 100
See application file for complete search history.

(56) References Cited

U.S. PATENT DOCUMENTS

| 2004/0215953 | A1* | 10/2004 | Cantwell | ............... | G06F 9/4418 |
| | | | | | 713/2 |
| 2005/0177710 | A1* | 8/2005 | Rothman | ............ | G06F 9/44505 |
| | | | | | 713/2 |
| 2006/0119384 | A1* | 6/2006 | Camarota | ........... | G06F 15/7867 |
| | | | | | 326/38 |

(Continued)

FOREIGN PATENT DOCUMENTS

| CN | 107357400 A | 11/2017 |
| CN | 114168196 A | 3/2022 |

(Continued)

OTHER PUBLICATIONS

TW Office Action for Application No. 111121835, dated Oct. 7, 2022, w/ First Office Action Summary.

(Continued)

Primary Examiner — Ji H Bae
(74) Attorney, Agent, or Firm — NIXON PEABODY LLP (57) ABSTRACT Methods and systems are disclosed that initiate, during a power-on self-test of a computer system, a pre-registered handler for accessing, modifying, or a combination thereof one or more registers within a basic input output system (BIOS) of the computer system. A request to access, modify, or a combination thereof at least one register of the one or more registers within the BIOS is received during runtime of an operating system of the computer system. The request with the pre-registered handler is processed to access, modify, or a combination thereof at least one register of the one or more registers within the BIOS corresponding to the request. A response to the request is provided based on data from the at least one register obtained by the pre-registered handler.

20 Claims, 5 Drawing Sheets (56) References Cited

U.S. PATENT DOCUMENTS

| | | | |
|---|---|---|---|
| 2006/0184794 A1* | 8/2006 | Desselle | G06F 21/575 713/166 |
| 2015/0089209 A1* | 3/2015 | Jacobs | G06F 21/575 713/1 |
| 2016/0011646 A1* | 1/2016 | Maity | G06F 9/4401 713/324 |
| 2019/0073285 A1 | 3/2019 | Hayashida | |
| 2020/0301714 A1* | 9/2020 | Dasar | G06F 3/0658 |

FOREIGN PATENT DOCUMENTS

| | | |
|---|---|---|
| TW | I446161 B | 7/2014 |
| TW | 202013135 A | 4/2020 |

OTHER PUBLICATIONS

TW Search Report for Application No. 111121835, dated Oct. 7, 2022, w/ First Office Action.

* cited by examiner

REMOTE ACCESS OF SYSTEM REGISTER CONFIGURATION

FIELD OF THE INVENTION

The present invention relates generally to providing access to data in computer systems. More particularly, aspects of this disclosure relate to a system and a method that allow for accessing data using a pre-registered handler.

BACKGROUND OF THE INVENTION

Servers are employed in large numbers for high demand applications, such as network based systems or data centers. The emergence of cloud computing applications has increased the demand for data centers. Data centers have numerous servers that store data and run applications accessed by remotely connected users. A typical data center has physical rack structures with attendant power and communication connections. Each rack may hold multiple application servers and storage servers. Each server generally includes hardware components, such as processors, memory devices, network interface cards, power supplies, and other specialized hardware. Each of the servers generally includes a baseboard management controller (BMC) that manages the operation of the server and communicates operational data to a central management station that manages the servers of the rack.

A typical server has a processing unit (e.g., central processing unit (CPU)) that may have multiple cores for computing operations. The cores run an operating system (OS) to communicate with other hardware components in the server.

The system management mode (SMM) is a well-known special-purpose operating mode provided for handling system-wide functions, such as power management or system hardware control in computer systems. The SMM offers a distinct and easily isolatable processor environment that operates transparently to the operating system, or executive and software applications. The processing unit executes the SMM firmware code in a separate address space that is inaccessible to other operating modes of the processing unit. The SMM can only be entered through a system management interrupt (SMI).

The SMM is an operating mode of firmware/BIOS to perform system management operations while the OS is running. During runtime, the CPU detects events and signals an SMI, triggering the CPU to enter SMM by jumping to the SMM entry point. While entering SMM, all cores/threads also enter SMM mode until the system management operations are completed.

In many processor architectures, the interrupt process is used for reducing the time waiting for requests from memory, interfaces, processors, or peripheral devices. Typically, a SMI is triggered through software or hardware. An interrupt handler is executed by firmware as part of the hardware abstraction layer (HAL), which also includes the BIOS. The interrupt handler triggers the SMI. The execution of the OS is suspended when an SMI interrupt occurs. Data related to the SMI is typically stored in a register, such as a Model Specific Register (MSR) in the CPU executing the SMM. While the SMM is executed, system services and applications stop and cannot provide service, resulting in downtime for the computer system.

A computer system may also have some hard-to-access data in design (e.g., Reliability, Availability, Serviceability (RAS) related status and settings), which generally need an external tool or a specific condition, like SMM to reach, and is not friendly for user. Also, some system settings need a computer system reset to achieve the changes, causing an unavailable period in runtime, stopping the system from providing service.

Figure 1:
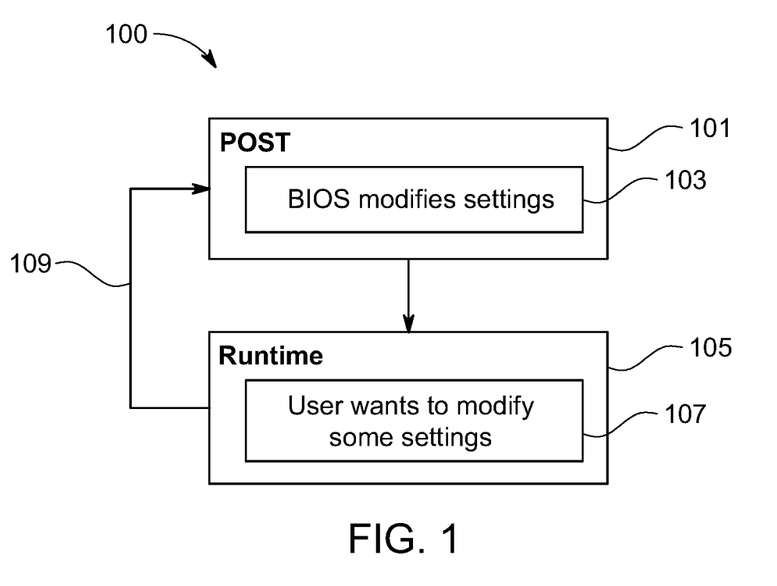
FIG. 1 shows a process for modifying BIOS settings within a computer system.

FIG. 1 shows a process for modifying system settings, specifically BIOS settings, within a computer system. Initially, step 101 occurs when the computer system first turns on. Specifically, the computer system undergoes a Power On Self-Test (POST). During the POST, a user can easily modify system settings, including BIOS settings, such as at step 103. However, after step 103 completes, and the POST completes, the process 100 proceeds to step 105, where the OS of the computer system begins, resulting in runtime of the OS.

At some point during the runtime at step 105, a user may want to access or change the BIOS settings at step 107. However, to obtain such access or make such changes, the user must reset the computer system at step 109 to revert back to the POST at step 101. This causes unwanted downtime of the computer system.

Thus, there is a need for a system and a method that allow for easier access and modifications of computer system settings, such as BIOS settings

SUMMARY OF THE INVENTION

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to one embodiment of the present disclosure, a method is disclosed that includes initiating a pre-registered handler for accessing, modifying, or a combination thereof one or more registers within a basic input output system (BIOS) of a computer system during a power-on self-test of the computer system. The method further includes receiving a request to access, modify, or a combination thereof at least one register of the one or more registers within the BIOS during runtime of an operating system of the computer system. The method further includes processing the request with the pre-registered handler to access, modify, or a combination thereof at least one register of the one or more registers within the BIOS corresponding to the request. The method further includes providing a response to the request based on data from the at least one register obtained by the pre-registered handler.

According to one aspect of the above embodiment, the request is received from a baseboard management controller (BMC). The response can be provided to the BMC. A user who originated the request receives the response through an intelligent platform management interface (IPMI) of the BMC. The request can originate from an IPMI command.

According to another aspect of the above embodiment, the request can be received from the operating system of the computer system. The BIOS can provide the response by storing information representing the response in a specific location accessible by the operating system and the BIOS.

According to another aspect of the above embodiment, the one or more registers are associated with hard-to-access data that cannot be read or written during runtime of the operating system.

According to another aspect of the above embodiment, the method can further include restarting the computer system based on the request resulting in the at least one register being modified, the modification of the at least one register requiring restarting the computer system.

According to another embodiment of the present disclosure, a computer system includes a basic input output system (BIOS). The BIOS is configured to execute computer-readable instructions to initiate a pre-registered handler for accessing, modifying, or a combination thereof one or more registers within the BIOS during a power-on self-test of the computer system. The BIOS further is configured to execute computer-readable instructions to receive a request to access, modify, or a combination thereof at least one register of the one or more registers during runtime of an operating system of the computer system. The BIOS further is configured to execute computer-readable instructions to process the request with the pre-registered handler to access, modify, or a combination thereof at least one register of the one or more registers corresponding to the request. The BIOS further is configured to execute computer-readable instructions to provide a response to the request based on data from the at least one register obtained by the pre-registered handler.

According to one aspect of the above embodiment, the computer system further includes a baseboard management controller (BMC). The request can be received from a baseboard management controller. The response can be provided to the BMC. The user who originated the request can receive the response through an intelligent platform management interface of the BMC. The request can originate from an intelligent platform management interface command.

According to one aspect of the above embodiment, the computer system further includes a memory and a central processing unit executing computer-readable instructions stored on the memory to implement an operating system. The request is received from the operating system of the computer system.

According to one aspect of the above embodiment, the BIOS provides the response by storing information representing the response in a specific location accessible by the operating system and the BIOS within the memory. According to one aspect of the above embodiment, the one or more registers are associated with hard-to-access data that cannot be read or written during runtime of the operating system.

According to another embodiment of the present disclosure, a non-transitory computer readable medium having stored thereon software instructions that, when executed by a processor in a computer system, is disclosed. The software instructions, when executed by the processor in the computer system, cause the processor to initiate, during a power-on self-test of the computer system, a pre-registered handler for accessing, modifying, or a combination thereof one or more registers within a basic input output system (BIOS) of the computer system. The software instructions, when executed by the processor in the computer system, further cause the processor to receive a request to access, modify, or a combination thereof at least one register of the one or more registers within the BIOS during runtime of an operating system of the computer system. The software instructions, when executed by the processor in the computer system, cause the processor to process the request with the pre-registered handler to access, modify, or a combination thereof at least one register of the one or more registers within the BIOS corresponding to the request. The software instructions, when executed by the processor in the computer system, cause the processor to provide a response to the request based on data from the at least one register obtained by the pre-registered handler.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims.

While the invention is susceptible to various modifications and alternative forms, specific embodiments have been shown by way of example in the drawings and will be described in further detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Various embodiments are described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The various embodiments are not limited by the illustrated ordering of acts or events, as some acts may occur in different orders and/or concurrently with other acts or events. Furthermore, not all illustrated acts or events are required to implement a methodology in accordance with the present invention.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," "generally,"and the like, can be used herein to mean "at," "near," or "nearly at," or "within 3-5% of," or "within acceptable manufacturing tolerances," or any logical combination thereof, for example.

The systems and methods of the present disclosure involve configuring a pre-registered handler in the BIOS of a computer system. Hard-to-access data and corresponding executed actions are defined in the pre-registered handler at programming of the BIOS. After the pre-registered handler is initiated and the POST completes, the pre-registered handler provides the ability to access and modify settings and hard-to-access data in runtime (e.g., SMM-only registers, RAS-related registers, etc.). Hard-to-access data generally refers to data that cannot be read or written by a general register tool or OS software in runtime. Furthermore, or alternatively, hard-to-access data requires an external tool or a specific condition, like SMM mode, to reach. An example includes Intel SMM_ERR_SRC related registers, which indicate corresponding core or non-core portions of a processor posted an SMI signal and can only be accessed in SMM mode. Accessing these generally requires an Intel hardware fixture external tool, which is not user-friendly. The below table lists different access types and access methods of RAS-related registers:

| | Access Type | Can be accessed by |
|---|---|---|
| RAS related register | SMM read write register: These registers can only be read or written by software while in SMM mode | BIOS SMM error handler Chipset fixture and tool |
| | Regular runtime access register: These registers can be read or written by software. | BIOS SMM error handler Chipset fixture and tool OS software Generic register access tool |

The below table lists some examples of hard-to-access data:

| Hard-to-access registers | Description | Access mode | Attribute |
|---|---|---|---|
| CORE_SMI_ERR_SRC | Indicates corresponding core portion of processor posted an SMI | SMM only | To read and write 1 to clear |
| UNCORE_SMI_ERR_SRC | Indicates corresponding non-core portion of processor posted an SMI | SMM only | To read and write 1 to clear |
| SMM_MCA_CAP | Indicates support for enhanced SMM and machine check architecture features. | SMM only | To read only |
| CORE_SMI_ERR_INJ_CONTROL | Control error injection setting of processor core portions | Runtime SMM only | To read in runtime To write in SMM only |
| UNCORE_SMI_ERR_INJ_CONTROL | Control error injection setting of processor non-core portions | Runtime SMM only | To read in runtime To write in SMM only |
| IA32_MCi_CTLi | Control error conditions of corresponding machine bank architecture | SMM only | To read and write |
| CLEAR_SMI | Provide the ability to clear a pending SMI. | SMM only | To read and write |

This pre-registered handler of the present disclosure can be triggered by the system BMC or software running on the OS. Once this pre-registered handler is triggered, it can access the corresponding registers and configurations according to the requested data and respond with the required information to the user.

Figure 2:
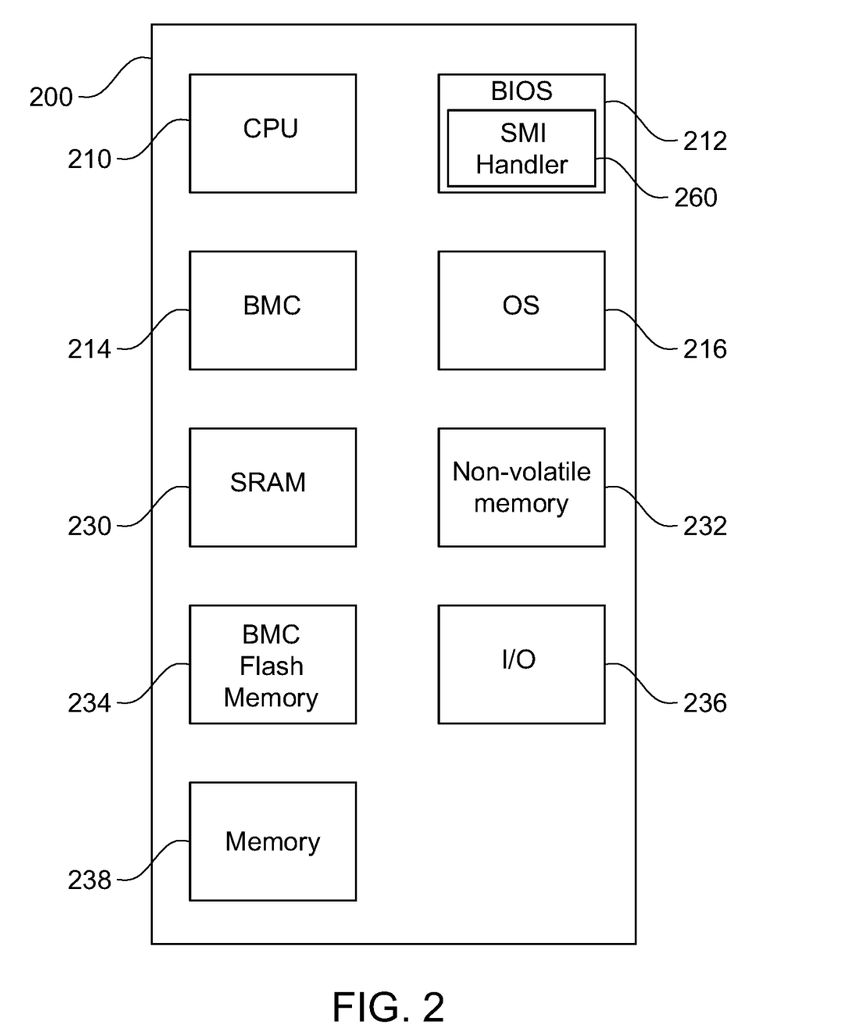
FIG. 2 shows a computer system configured to initiate a pre-registered handler for accessing or modifying BIOS settings within a computer system, according to aspects of the present disclosure.

FIG. 2 is a block diagram of a computer system 200 that includes functionality for accessing and modifying BIOS information through a pre-registered handler. In one or more embodiments, the computer system 200 is a server, but the principles disclosed herein may be incorporated in any computer system having the components described herein. The computer system 200 includes a central processing unit (CPU) 210, a platform BIOS 212, optionally a baseboard management controller (BMC) 214, and an operating system (OS) 216.

The computer system 200 can include a shared memory 230 that may be static random access memory (SRAM). The computer system 200 also can include a non-volatile memory 232, which may be a flash memory or a similar device. The computer system 200 can also include a dedicated BMC flash memory 234 that stores BMC firmware. In one or more embodiments, the non-volatile memory 232 may be the same flash memory as the dedicated BMC flash memory 234. There may also be separate flash memories. The BMC 214 can also access data written into the shared memory 230. In one or more embodiments, the shared memory 230 can be internal RAM on a BMC chip, such as an AST2500 available from ASPEED, that is mapped to system memory.

The platform BIOS 212 includes system management interrupt (SMI) handler 260. In this example, the SMI handler 260 processes system management interrupts.

As explained above, the System Management Mode (SMM) is an operating mode to perform system management operations by the BIOS 212 while the operating system (OS) 216 is running. During runtime of the computer system 200, the chipset of the CPU 210 detects certain events. Such events may include notifications from processor cores, memory devices, peripheral devices, and other components that may trigger an interrupt or a request originating from a user of the computer system 200. In this example, certain events signal an SMI.

The computer system 200 can also include I/O ports 236, for receiving commands from a user through one or more I/O devices, along with general memory 238, what can include or be limited to electrically erasable programmable read-only memory (EEPROM) 238.

Figure 3:
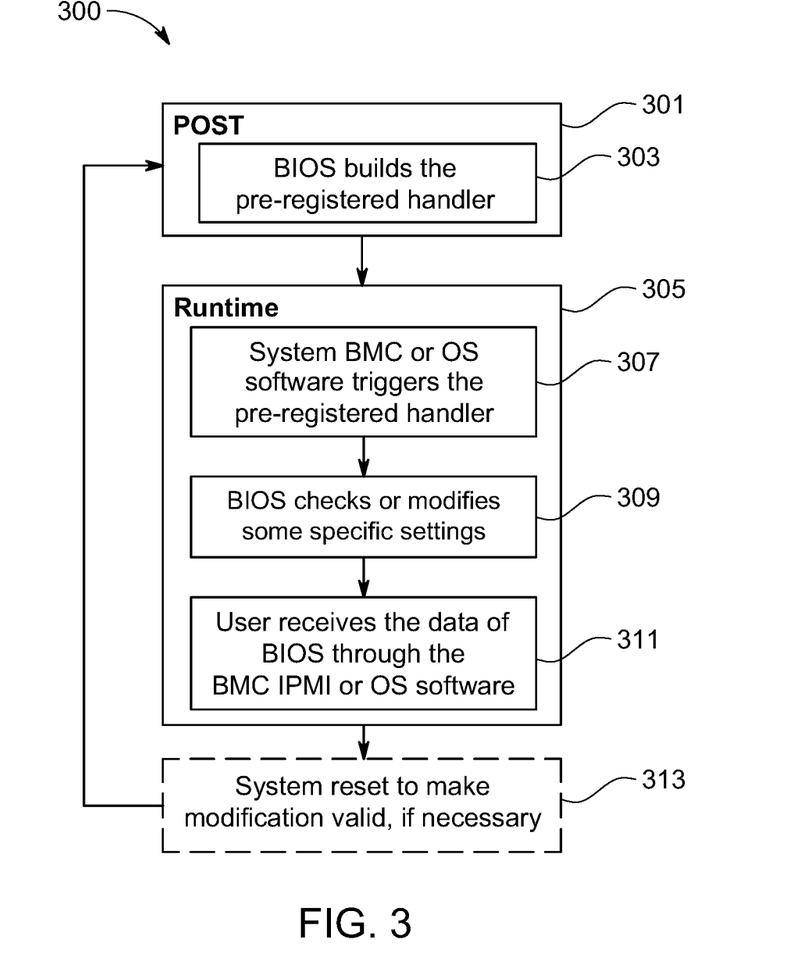
FIG. 3 shows a process for initiating a pre-registered handler for accessing or modifying BIOS settings within a computer system, according to aspects of the present disclosure.

FIG. 3 shows the process 300 of initiating and using a pre-registered handler within a computer system, such as the computer system 200, according to aspects of the present disclosure.

Initially, at step 301, a Power On Self-Test (POST) of the computer system occurs. During the POST, the BIOS of the computer system initiates the pre-registered handler at step 303. The pre-registered handler is initiated to handle access and modification of computer system settings, such as BIOS settings and hard-to-access data during runtime of the OS. The pre-registered handler includes an identification portion and an execution portion. The identification portion is present because the BIOS may not know what triggered the pre-registered handler, such that the identification portion identifies which action or which device triggered it for then executing its corresponding procedure. In other words, identification is to decide what condition would make the pre-registered handler be executed.

Once the POST and initiation of the pre-registered handler are complete, runtime of the computer system begins at step 305. Unless otherwise noted, the subsequent steps of the process 300 occur during runtime 305.

At some point during runtime, an action occurs that triggers the pre-registered handler at step 307. As described below, the action can be a request for access to or modification of information within the BIOS, which triggers the pre-registered handler. The request can originate from the system BMC or OS software, as further disclosed below. For example, a request is received to access, modify, or a combination thereof at least one register of one or more registers within the BIOS during runtime of the operating system of the computer system.

At step 309, the BIOS processes the request with the pre-registered handler to access, modify, or a combination thereof at least one register of the one or more registers within the BIOS corresponding to the request. As discussed above, the pre-registered handler includes an identification portion and an execution portion. The identification portion is to decide what condition would make the pre-registered handler execute. When a user sends a request to access specific settings in runtime, such as by an IPMI command or OS software, the request includes a parameter that identifies the actual purpose, e.g., to read error status, to write the error control setting, etc. These parameters are understood by the BIOS, so the BIOS can check or modify specific settings based on the parameters.

At step 311, the BMC IPMI or OS software respond with data from the BIOS obtained via the pre-registered handler. Thus, the user receives the requested data from the BIOS.

Optionally, at step 313, the computer system resets depending on whether a modification occurred that requires resetting the computer system. For example, for a conventional system without a pre-registered handler, modification of RAS-related settings under a BIOS menu requires a system resent to make modification valid. For the computer system 200 system with a pre-registered handler, the pre-registered handler allows modification of most RAS-related settings in runtime without a system reset, except for some write-once registers. For those write-once registers, a system reset is still required to make the pre-registered handler write action valid.

The below table lists some possible commands which can be embodied by the pre-registered handler:

| OEM command | Access mode for related registers | Attribute | Reset to make modification valid and take effect? |
|---|---|---|---|
| Get error signal control | SMM only Runtime and SMM | To read | No |
| Get error injection control | SMM only | To read | No |
| Get SMI error source and status | SMM only Runtime and SMM | To read | No |
| Get SMRAM data | SMM only | To read | No |
| Get error status and counter | Runtime | To read | No |
| Set error signal control | SMM only Runtime | To Write | No |
| Set error injection control | SMM only | To Write | Yes (some error injection control registers can be only written once after reset) |
| Set SMRAM data | SMM only | To Write | No |
| Clear SMI | SMM only | To Write | No |
| Clear error status and counter | Runtime | To Write | No |

As disclosed, the pre-registered handler can be triggered by a BMC (e.g., the BMC 214) or an OS (e.g., the OS 216).

Figure 4:
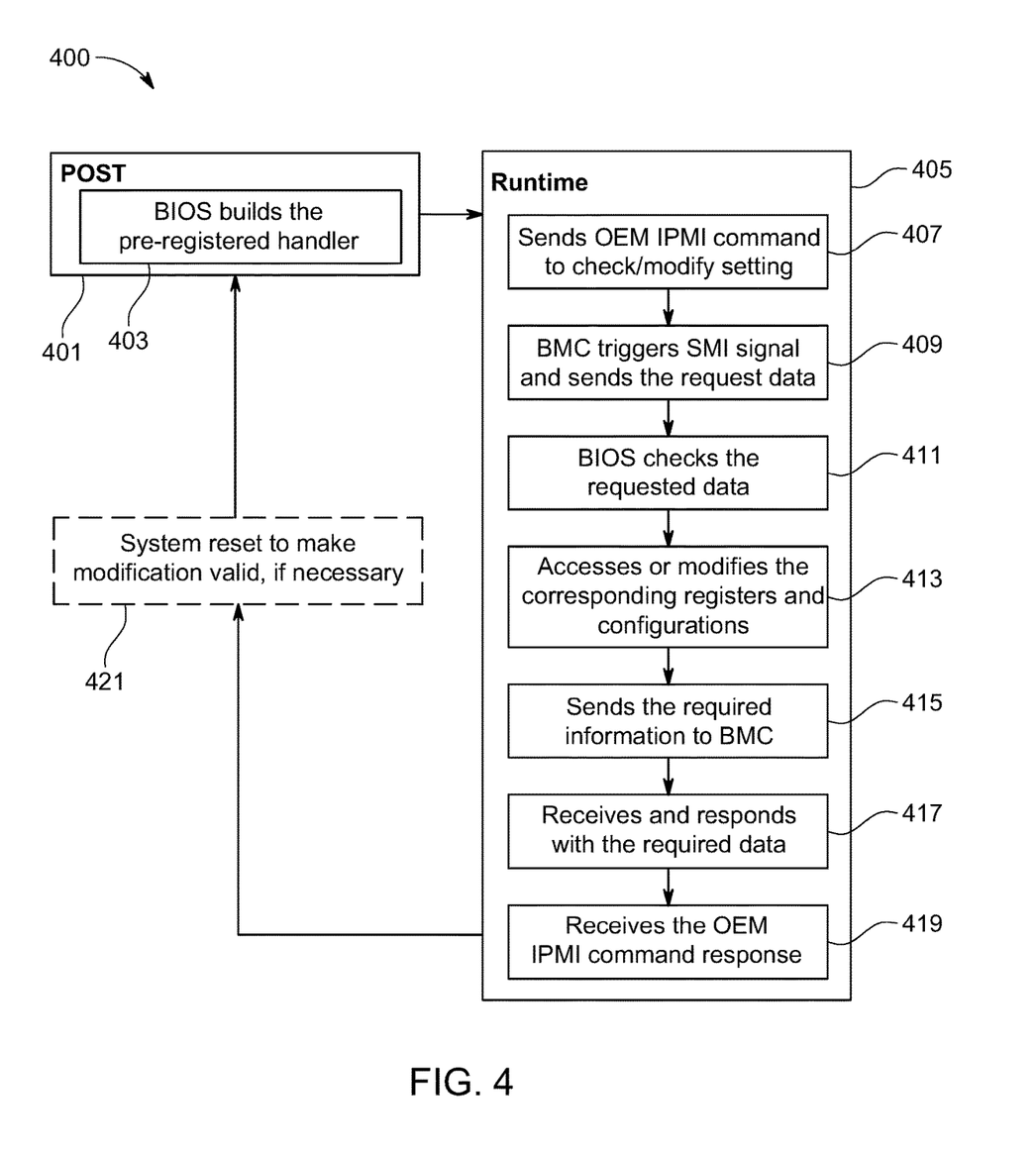
FIG. 4 shows a process for initiating a pre-registered handler for accessing or modifying BIOS settings within a computer system using a BMC, according to aspects of the present disclosure.

FIG. 4 shows the process 400 involved with respect to the pre-registered handler being triggered by the BMC, according to aspects of the present disclosure.

At step 401, the computer system turns on and performs the POST. As part of step 401 and the POST, and similar to the process 300, the BIOS initiates a pre-registered handler for accessing, modifying, or a combination thereof one or more registers within the BIOS at step 403. As disclosed above, the pre-registered handler can handle accessing and modifying settings and hard-to-access data during runtime.

After step 403, the POST completes, and the computer system proceeds to runtime at step 405 by executing the operating system. Unless otherwise noted, the subsequent steps of the process 400 occur during runtime.

At step 407, a user sends a command to check or modify settings within the BIOS. In one or more embodiments, the user can send the command through an intelligent platform management interface (IPMI), such as an original equipment manufacturer (OEM) IPMI. The command is sent to the BMC.

The IPMI command is a combination of many digital numbers defined by an IPMI spec. However, an OEM IPMI command can have additional requirements or a different specific design, which is generally referred to an OEM IPMI command herein. Both the BIOS and the BMC can follow the design coding of the OEM IPMI.

At step 409, the BMC creates and sends a system management interrupt (SMI) signal with the user's request to the BIOS based on the OEM IPMI command. The SMI signal includes the information in the user's request. Specifically, after the BMC receives the OEM IPMI command, the BMC knows that the user wants to access SWIM-access-only register. Accordingly, the BMC triggers an SMI to the system by a specific hardware signal, such as a General-Purpose input/output (GPIO).

At step 411, upon receipt of the SMI signal with the user's request, the BIOS checks the requested data within the request. Specifically, after receiving the SMI, the computer system enters SMM to call BIOS SMM handler to check if the specific hardware signal is active.

At step 413, the BIOS accesses the corresponding registers and configurations according to the requested data received in the SMI from the BMC via the pre-registered handler, and the pre-registered handler must be registered in POST previously.

At step 415, the BIOS returns the requested information to the BMC.

At step 417, the BMC receives the data from the BIOS.

At step 419, the OS receives the response from the BMC. The user can check the response of OEM IPMI command for the modification. For example, the OEM IPMI response can be designed consisting with data following a completion code. The data can include the value which is checked by the user, and the completion code can indicate if modification succeeded.

At step 421, the computer system optionally resets depending on whether a modification is necessary to make any modifications that may have occurred, where such modification still requires a system reset despite being implemented using the pre-registered handler. As discussed above, for a conventional computer system without a pre-registered handler, modification of RAS-related settings through a BIOS menu requires a system reset to make modification valid. For the computer system of the present disclosure with a pre-registered handler, the computer system can modify most RAS-related settings, except some write once registers in runtime.

Figure 5:
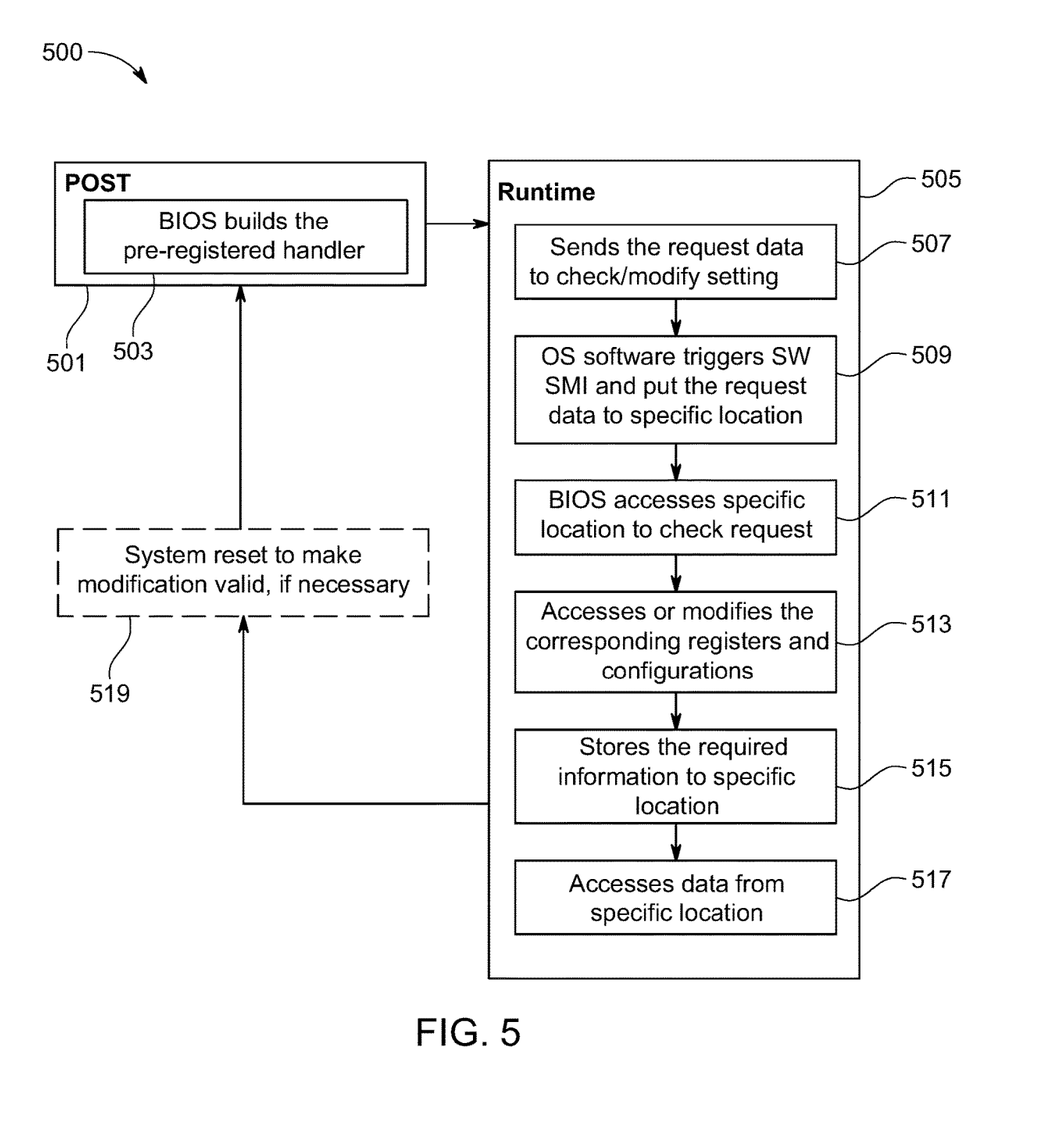
FIG. 5 shows a process for initiating a pre-registered handler for accessing or modifying BIOS settings within a computer system using an OS, according to aspects of the present disclosure.

FIG. 5 shows the process 500 involved with respect to the pre-registered handler being triggered by a software code or function, according to aspects of the present disclosure.

At step 501, the computer system turns on and performs the POST. As part of the POST, step 503 occurs where the BIOS initiates the pre-registered handler, similar to steps 303 and 403 above.

After step 503, the POST completes, and the computer system proceeds to runtime at step 505 by executing the operating system. Unless otherwise noted, the subsequent steps of the process 500 occur during runtime.

After the POST and during runtime 505 of the computer system, the process 500 proceeds to step 507 when a user sends a request for data to a specific location to check or modify configurations. The specific location is somewhere to store the request data, and the BIOS can access from the data from the location. For example, the location can be a specific I/O location, memory location, or NVRAM location, or any location that both the OS and the BIOS can access data.

In response, at step 509, the OS software triggers the software SMI. The software SMI is triggered by the OS software via I/O access to the designated location. The designed location is defined by BIOS, and the location information is reported to the OS from an ACPI table, which is to let OS know the hardware configuration level data.

At step 511, the BIOS accesses the specific location associated with the request. Since the BIOS accesses the specific location, the location is coded into the identification portion of the pre-registered handler.

At step 513, the BIOS accesses or modifies the corresponding registers and configurations. This step can be the same as the corresponding step 413 in FIG. 4 above, except that its execution time point is always in runtime, and the runtime executed handler must be registered in POST previously.

At step 515, the BIOS stores the required information to the specific location.

At step 517, the OS software accesses the data from the specific location.

At step 519, the computer system optionally resets depending on whether a modification is necessary to make the change valid. As disclosed above, some registers can be read by software and can only be written by software once after reset. For those write-once registers, a system reset is needed to make the pre-registered handler write action valid.

Based on the foregoing, the pre-registered handler makes it possible to check or modify some specific settings, without external tools or resetting the system, which ultimately makes system configuration, error triage, etc. easier. The present invention further reduces system downtime by avoiding system reset when specific configuration changes are needed, allows for access to specific registers (e.g., SMM-only registers) more easily, and provides a better experience for error triage.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

Although the disclosed embodiments have been illustrated and described with respect to one or more embodiments, equivalent alterations and modifications will occur or be known to others skilled in the art upon the reading and understanding of this specification and the annexed drawings. In addition, while a particular feature of the invention may have been disclosed with respect to only one of several embodiments, such feature may be combined with one or more other features of the other embodiments as may be desired and advantageous for any given or particular application.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

The terminology used herein is for the purpose of describing particular embodiments only, and is not intended to be limiting of the invention. As used herein, the singular forms "a,""an," and "the" are intended to include the plural forms as well, unless the context clearly indicates otherwise. Furthermore, to the extent that the terms "including," "includes," "having," "has,""with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A method comprising:
   initiating, during a power-on self-test of a computer system, a pre-registered handler for accessing, modifying, or a combination thereof one or more registers within a basic input output system (BIOS) of the computer system;
   receiving a request to access, modify, or a combination thereof at least one register of the one or more registers within the BIOS during runtime of an operating system of the computer system;
   processing the request with the pre-registered handler to access, modify, or a combination thereof the at least one register of the one or more registers within the BIOS corresponding to the request; and
   providing a response to the request based on data from the at least one register obtained by the pre-registered handler,
   wherein the request is received from a baseboard management controller (BMC).

2. The method of claim 1, wherein the response is provided to the BMC.

3. The method of claim 2, wherein a user who originated the request receives the response through an intelligent platform management interface of the BMC.

4. The method of claim 1, wherein the request originates from an intelligent platform management interface command.

5. The method of claim 1, wherein the BIOS provides the response by storing information representing the response in a specific location accessible by the operating system and the BIOS.

6. The method of claim 1, wherein the one or more registers are associated with hard-to-access data that cannot be read or written during runtime of the operating system.

7. The method of claim 1, further comprising restarting the computer system based on the request resulting in the at least one register being modified, the modification of the at least one register requiring restarting the computer system.

8. A computer system comprising:
   a baseboard management controller (BMC); and
   a processor that is configured to execute a basic input output system (BIOS), the BIOS including computer-readable instructions that, when executed by the processor, cause the processor to:
      initiate a pre-registered handler for accessing, modifying, or a combination thereof one or more registers within the BIOS during a power-on self-test of the computer system;
      receive a request to access, modify, or a combination thereof at least one register of the one or more registers during runtime of an operating system of the computer system;
      process the request with the pre-registered handler to access, modify, or a combination thereof the at least one register of the one or more registers corresponding to the request; and
      provide a response to the request based on data from the at least one register obtained by the pre-registered handler,
      wherein the request is received from the BMC.

9. The computer system of claim 8, wherein the response is provided to the BMC.

10. The computer system of claim 9, wherein a user who originated the request receives the response through an intelligent platform management interface of the BMC.

11. The computer system of claim 8, wherein the request originates from an intelligent platform management interface command.

12. The computer system of claim 8, wherein the BIOS provides the response by storing information representing the response in a specific location accessible by the operating system and the BIOS.

13. The computer system of claim 8, wherein the one or more registers are associated with hard-to-access data that cannot be read or written during runtime of the operating system.

14. A method comprising:
   initiating, during a power-on self-test of a computer system, a pre-registered handler for accessing, modifying, or a combination thereof one or more registers within a basic input output system (BIOS) of the computer system;
   receiving a request to access, modify, or a combination thereof at least one register of the one or more registers within the BIOS during runtime of an operating system of the computer system;
   processing the request with the pre-registered handler to access, modify, or a combination thereof the at least one register of the one or more registers within the BIOS corresponding to the request;
   providing a response to the request based on data from the at least one register obtained by the pre-registered handler; and
   restarting the computer system based on the request resulting in the at least one register being modified, the modification of the at least one register requiring restarting the computer system.

15. The method of claim 14, wherein the response is provided to a BMC.

16. The method of claim 15, wherein a user who originated the request receives the response through an intelligent platform management interface of the BMC.

17. The method of claim 14, wherein the request originates from an intelligent platform management interface command.

18. The method of claim 14, wherein the request is received from the operating system of the computer system.

19. The method of claim 18, wherein the BIOS provides the response by storing information representing the response in a specific location accessible by the operating system and the BIOS.

20. The method of claim 14, wherein the one or more registers are associated with hard-to-access data that cannot be read or written during runtime of the operating system.

\* \* \* \* \*